UNITED STATES PATENT OFFICE.

GEORGE H. A. WILLIAMS, OF CONCORD, NEW HAMPSHIRE.

SALVE.

SPECIFICATION forming part of Letters Patent No. 377,592, dated February 7, 1888.

Application filed April 30, 1887. Serial No. 236,669. (No specimens.)

*To all whom it may concern:*

Be it known that I, GEORGE H. A. WILLIAMS, a citizen of the United States, residing at Concord, in the county of Merrimac and State of New Hampshire, have invented certain new and useful Improvements in Salve for Boils, Burns, and Various Inflammations, of which the following is a specification.

My composition consists of the following ingredients combined in the proportions stated, viz: pure lard, four pounds; beef-tallow, two and one-half pounds; of the inner bark of sweet elder, (about,) one pound; English camomile-blossoms, one ounce; powdered borax, one-half ounce; sulphur, one-half ounce; oil of almonds, ninety drops. These ingredients are to be thoroughly mingled as follows: Place all together in a suitable vessel and heat to boiling-point and keep simmering for from four to five hours, then pass it through three or more muslin strainers, when it may be poured into suitable boxes and labeled.

This composition may be substituted for poultices of various kinds with much better results in the treatment of boils, abscesses, carbuncles, &c., and for burns, cuts, bruises, &c., it possesses wonderful soothing and curative qualities.

In using the above composition or salve for cuts and bruises the afflicted parts should be bathed and the said salve applied freely on linen.

Of the above ingredients either the lard or beef-tallow may be replaced by mutton-tallow with nearly as good results, and the almond-flavoring may be replaced by almost any other flavor desired without injury to the curative qualities of the salve; but the sweet-elder bark, the camomile-blossoms, the borax, and sulphur I consider essential to the composition.

Having described my composition, what I claim, and desire to secure by Letters Patent, is—

In a healing-salve, the herein-described ingredients, consisting of pure animal grease, bark of sweet elder, camomile-blossoms, borax, sulphur, and almond-oil, substantially in or about the proportions specified.

In testimony whereof I affix my signature in presence of two witnesses.

GEO. H. A. WILLIAMS.

Witnesses:
J. B. THURSTON,
NATHANIEL E. MARTIN.